United States Patent [19]

Kourtides et al.

[11] Patent Number: 4,598,007
[45] Date of Patent: Jul. 1, 1986

[54] LIGHT WEIGHT FIRE RESISTANT GRAPHITE COMPOSITES

[75] Inventors: Demetrius A. Kourtides, Gilroy; John A. Parker, Los Altos; Ming-Ta S. Hsu, San Jose, all of Calif.

[73] Assignee: The United States of America as represented by the Administrator of the National Aeronautics and Space Administration, Washington, D.C.

[21] Appl. No.: 706,682

[22] Filed: Feb. 28, 1985

[51] Int. Cl.$^4$ ............................................. B32B 3/12
[52] U.S. Cl. .................................. 428/116; 428/408; 428/921; 526/265
[58] Field of Search .................. 428/116–118, 428/73, 408, 921; 524/548; 525/186; 526/262, 265

[56] References Cited

U.S. PATENT DOCUMENTS

| | | | |
|---|---|---|---|
| 3,582,447 | 6/1971 | Stolki | 428/116 |
| 3,600,249 | 8/1971 | Jackson et al. | 428/116 X |
| 3,811,997 | 5/1974 | Yuan | 428/116 |
| 3,899,626 | 8/1975 | Steffen | 428/116 X |
| 3,914,494 | 10/1975 | Park | 428/408 X |
| 3,932,689 | 1/1976 | Watanabe et al. | 428/418 |
| 4,052,523 | 10/1977 | Rhodes et al. | 428/116 |
| 4,086,378 | 4/1978 | Kam et al. | 428/116 X |
| 4,135,019 | 1/1979 | Kourtides et al. | 428/117 |
| 4,395,514 | 7/1983 | Edelman | 428/473.5 X |
| 4,526,925 | 7/1985 | Parker et al. | 526/262 X |

Primary Examiner—Henry F. Epstein
Attorney, Agent, or Firm—Darrell G. Brekke; John R. Manning; Robert D. Marchant

[57] ABSTRACT

Composite structures having a honeycomb core and characterized by lightweight and excellent fire resistance are provided. These sandwich structures employ facesheets made up of bismaleimide-vinyl styrylpyridine copolymers with fiber reinforcement such as carbon fiber reinforcement. In preferred embodiments the facesheets are over-layered with a decorative film. The properties of these composites make them attractive materials of construction for aircraft and spacecraft.

16 Claims, 3 Drawing Figures

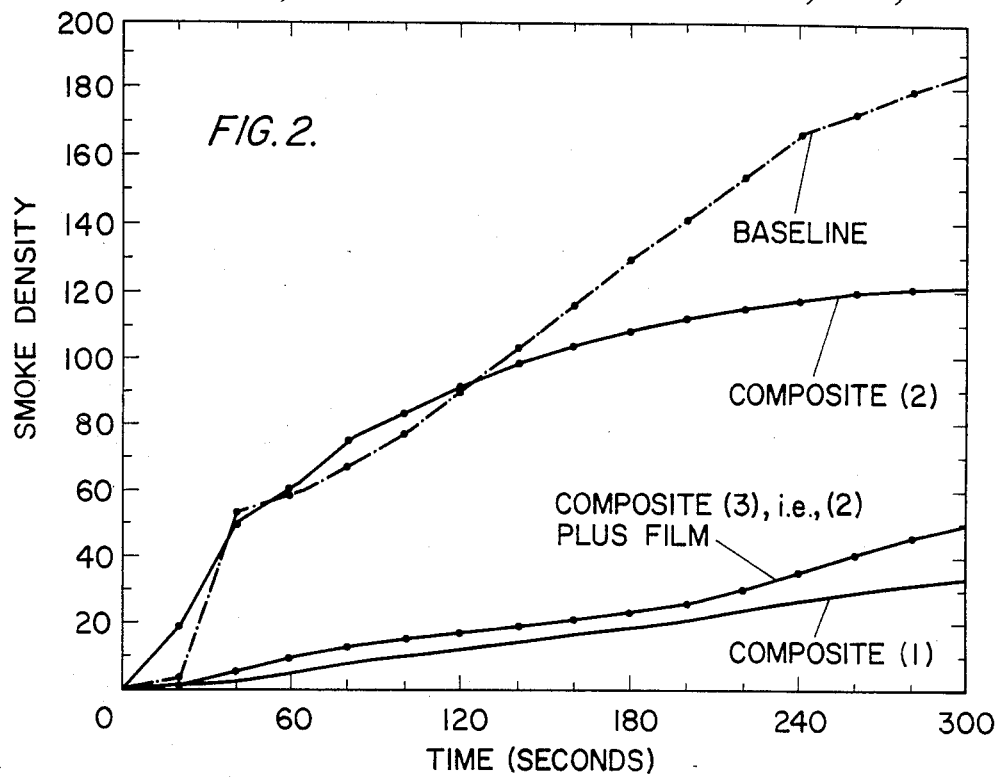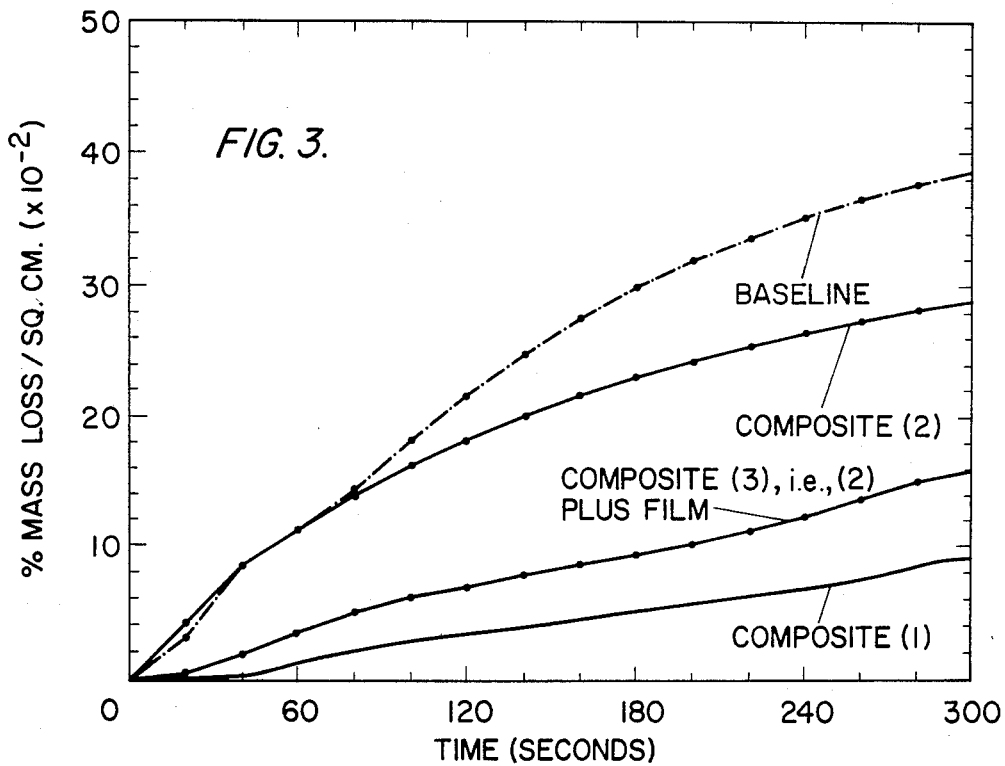

LIGHT WEIGHT FIRE RESISTANT GRAPHITE COMPOSITES

ORIGIN OF THE INVENTION

The invention described herein was made in the performance of work under a NASA contract and is subject to the provisions of Public Law 96-517 (35 U.S.C. §200 et seq.). The contractor has not elected to retain title to the invention.

TECHNICAL FIELD

This invention is in the field of low density fire resistant laminate structures, more particularly laminates having a reinforced resin facing adherent to a honeycomb cell structure core.

BACKGROUND

It is recognized that multilayer composite or "sandwich" structures offer weight and strength advantages that make them attractive materials of construction especially for aircraft panels. Such structures of the art and, likewise, the composites of this invention have a general construction as depicted in FIG. 1. FIG. 1 is not to scale as usually these composites are a centimeter or less in thickness and much longer and wider than they are thick, i.e. they are substantially two dimensional. In FIG. 1 a composite 10 is shown having a lightweight honeycomb core 11 sandwiched between two faceplates or facesheets 12 and 13. The facesheets close the open ends of the honeycomb and impart strength and rigidity to the composite. Usually two facesheets are present but, if desired, only one can be present. Facesheet 12 is shown as a two layer laminate of structural member 14 and decorative overlayer 15. Facesheet 13 is shown having the same configuration. If desired, the decorative layer can be left off of one or both of the facesheets or, if desired, an additional overcoating layer could be present with either or both of the facesheets. Generally, such composite structures have employed glass-epoxy resins as facesheets combined with a polyamide core. The various layers are held to one another with adhesives. These adhesive layers are not depicted in FIG. 1.

In the past, composite panels and aircraft lining structures have often been prepared by first silk screening a decorative surface onto a 0.005 cm polyvinyl fluoride film (Tedlar) by a continuous web process. After drying, a 0.0025 cm transparent polyvinyl fluoride film coated on one side with polymethyl methacrylate is bonded to the decorative film to provide protection for the printed surface.

This laminate is then bonded to one ply of epoxy-preimpregnated 181 E glass, and may have a surface texture impressed during the bonding operation. This provides a facesheet that is in turn bonded to the core.

One core material presently employed for sandwich paneling is an aromatic polyamide (sold under the tradename Nomex HRH-10) hexagonal-cell honeycomb structure. The cell size may be 0.312 cm, 0.625 cm, or 0.937 cm, depending upon the properties desired in the finished panel.

Structures and panels prepared from epoxy-containing materials have exhibited relatively higher heat release rates, higher mass injection rates or mass losses because of the inherent flammability of the epoxy resin facesheet material. The prior art structures evolve large quantitiies of smoke and toxic fumes when exposed to fire or heat also because of the epoxy present in the facesheets.

The present acute awareness of aircraft interior flammability problems throughout the military and civilian air-travel industry and the agencies which regulate it has led to a real need for a composite or sandwich material of construction which offers desired strength and low weight but in addition is more fire resistant than materials of the art.

Representative patents relating generally to these materials include:

U.S. Pat. No. 4,135,019 of Kourtides and Parker which relates to a composite laminate structure having a layer of glass cloth preimpregnated with polybismaleimide resin and adhered to a polybismaleimide glass or aromatic polyamide paper honeycomb cell structure which is filled or partially filled with a syntactic foam consisting of a mixture of bismaleimide resin and carbon microballoons;

U.S. Pat. No. 3,914,494 of Park which involves a high directional carbon fiber tape of an open weave construction which is impregnated with an aromati,c polyimide to give a material that may be used in a facing sheet;

U.S. Pat. No. 3,899,626 of Steffen which relates to the manufacture of a composite article having at least one layer comprising a prepolymer of bisimide and polyamine and at least one layer of a stock material; and U.S. Pat. No. 3,811,997 of Yuan that relates to laminate articles comprised of a film of an aromatic polyimide laminated over an impregnated fibrous reinforced cloth which may optionally be laminated over a honeycomb structure.

Additional patents which are believed to show the current state of the laminate art include:
U.S. Pat. No. 3,582,447 of Slotki;
U.S. Pat. No. 3,600,249 of Jackson et al;
U.S. Pat. No. 3,932,689 of Watanabe et al;
U.S. Pat. No. 4,052,523 of Rhodes et al;
U.S. Pat. No. 4,086,378 of Kam et al; and
U.S. Pat. No. 4,395,514 of Edelman.

Also of interest is commonly assigned U.S. Ser. No. 553,339, filed on Nov. 18, 1983, now U.S. Pat. No. 4,526,925 which discloses certain styryl pyridines and copolymers thereof which are used in the laminates of this invention.

STATEMENT OF THE INVENTION

We have now discovered a new laminate structure. This structure is characterized by having a facesheet comprising reinforcement and vinyl styrylpyridine-bismaleimide copolymer. This facesheet is adhered to a "honeycomb" core with a polymerizable film adhesive which may be an added material or may be an uncured vinyl styrylpyridine-bismaleimide. In a preferred embodiment the structure is decorated or protected with one or more additional adhered films such as a polyether ether ketone film overlaying the facesheet.

In other aspects, this invention provides methods for making such composites by (1) adhering such a preformed facesheet, with or without the decorative film, to a honeycomb or (2) by adhering a noncured facesheet to a honeycomb and curing it and bonding it in situ to the honeycomb.

In preferred embodiments, the honeycomb is an aromatic polyamide paper honeycomb cell structure material.

Structures in accordance with the present invention possess excellent thermo/physical properties. When exposed to heat the structures of this invention exhibit a marked reduction in the density of smoke produced and the rate of mass injection or pyrolysis, two characteristics which greatly improve the chances of survival of people in fires in confined spaces. In addition these structures weigh approximately 20-25% less than the conventional epoxy-glass composites, a feature which is important in fuel savings for aircraft. In addition the structures have processing and curing parameters comparable to the conventional epoxy-glass composites, thus decreasing the cost of manufacturing compared to other high temperature and fire resistant resins such as the polyimides. Such improved properties, coupled with increased mechanical properties, highly recommend the new structures for use in aircraft interiors.

BRIEF DESCRIPTION OF THE DRAWINGS

In the drawings:

FIG. 2 is a graph comparing the smoke density observed when heating to smoldering the present materials with the smoke density obtained with a material of the art; and FIG. 3 is a graph comparing mass loss of new materials with a material of the art at various periods of 5 W/cm² heating.

DETAILED DESCRIPTION OF THE INVENTION

Figure 1:
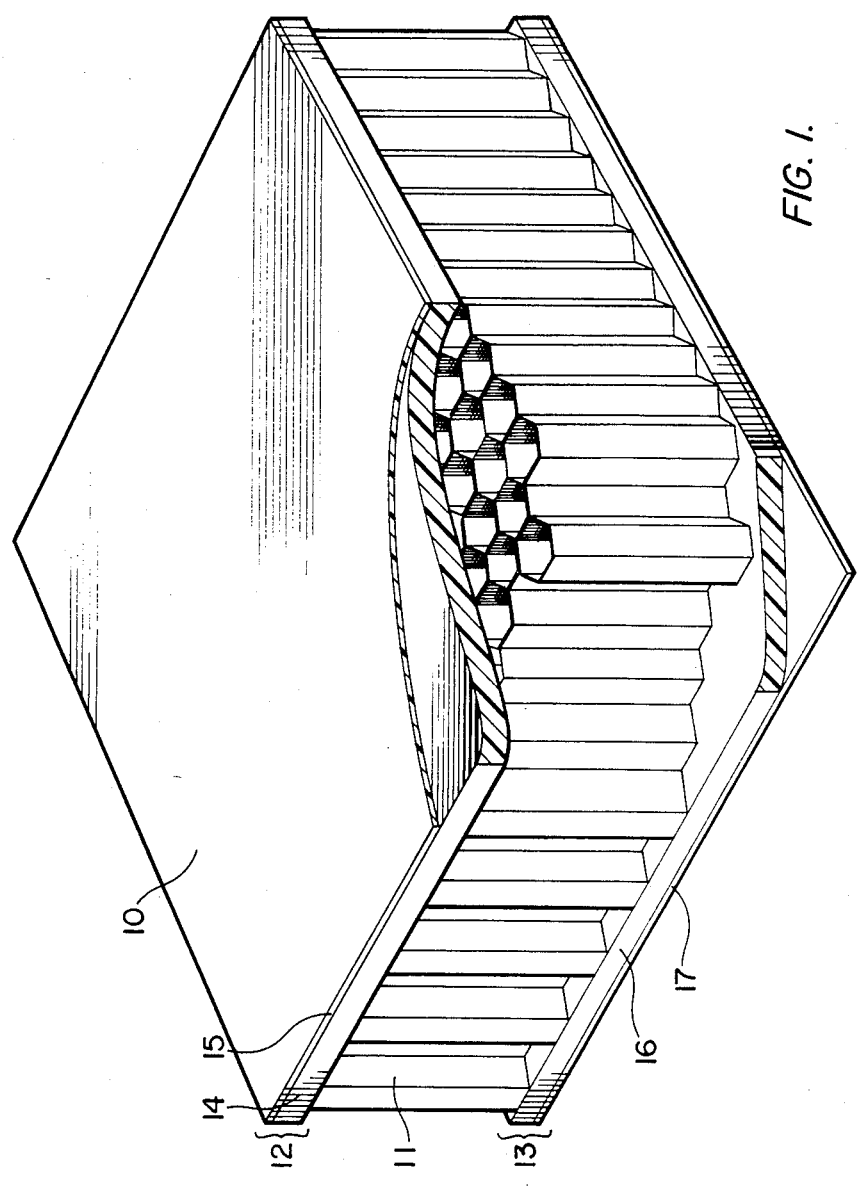
FIG. 1 is a not-to-scale cut away view of a typical composite structure.

The laminates of the present invention employ a copolymer of bismaleimide "BMI" with a vinyl styrylpyridine oligomer "VPSP" in their facesheets. The first three sections of this detailed description will describe these two components, and their blends. Then the reinforcement used in the facesheet will be described along with the preparation of the facesheet followed by a description of the honeycomb core. Next, the optional decorative overlayers employed will be described, followed by a description of the adhesives and fabrication methods employed.

The Bismaleimide

The bismaleimides used herein are represented structurally by the formula

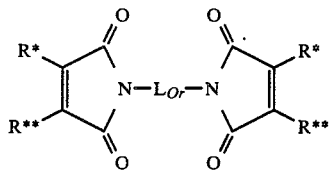

wherein R* and R** independently are hydrogen or a 1 to 4 carbon alkyl. Preferably R* and R** are hydrogen or $CH_3$ and more preferably at least one of the groups is hydrogen. $L_{Or}$ is a covalent organic linking group, that is a bivalent organic group containing in its structure an aliphatic chain or at least one aromatic ring. Many suitable examples of these bismaleimides are available commercially. They are prepared synthetically by a sequenced addition of a diamine to maleic anhydride followed by cyclization.

Bismaleimide materials can be drawing from resins having as $L_{Or}$ simple

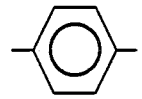

aromatic rings as were used in the pioneering Gemon resins sold by General Electric, and

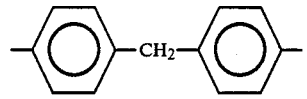

aromatic rings as are found in commercial Kerimid 353 and Kerimid 601 resins of Rhone-Poulenc to more involved materials such as Technochemie's H-795 resin:

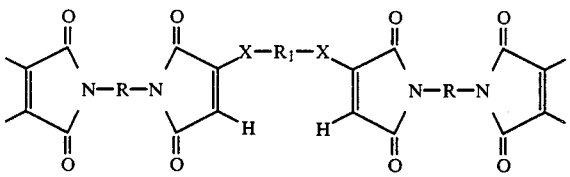

wherein R is an aromatic ring and $X—R_1—X$ is a Michael addition coupling group Technochemie's M-751 resin which is a "eutectic" mixture of

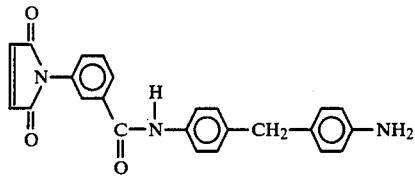

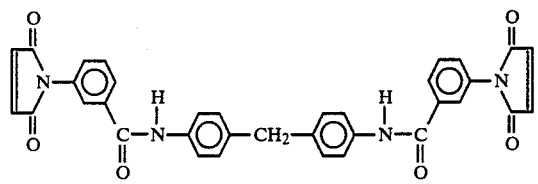

In general, $L_{Or}$ can be any organic linking group that is relatively inert, that permits the bismaleimide to be intimately admixed with the vinyl pyridine material either by melting or by dissolving in a common solvent and that does not interfere with the reactivity of the maleimide units. The H-795 type bismaleimides offer the advantage of working well in hot-melt systems.

The materials are commercially available and may be prepared by the method described in U.S. Pat. No. 4,211,861, if desired.

Vinyl Styrylpyridine Oligomers (VPSP)

The vinyl styrylpyridine materials employed herein are oligomeric materials that have the structure

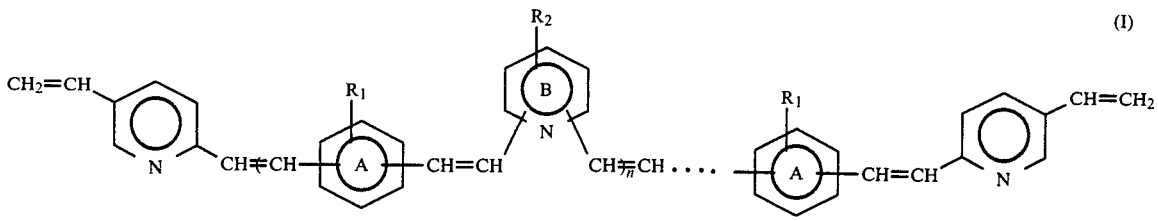

wherein n is an integer from 1 to 10, most advantageously 1 to 4, $R_1$ is hydrogen or a lower alkyl of 1 to 4 carbons, especially hydrogen or methyl, but more especially, hydrogen; and $R_2$ is an organic group such as a 1 to 4 carbon alkyl, or a 1 to 4 carbon alkoxy, a halo-substituted 1 to 4 carbon alkyl, such as, for example, methyl, ethyl, propyl, butyl, methoxy, ethoxy, 2-chloroethyl, chloromethyl. $R_2$ is especially a methyl or methoxy.

The structure I is an "average" structure and is provided to show a representative structure at the A and B rings. The exact substitution patterns on the A and B rings can vary. The A rings should have their two double bonds in a "1,3" (meta) or "1,4" (para) configuration. The B rings should have their two olefin groups i.e. "vinyl" groups and $R_2$ in a "2,6-divinyl-4-$R_2$" or a "2,4-divinyl-6-$R_2$" configuration.

These oligomeric materials are prepared by the two step process of (1) condensing a 2,6-dimethyl-4-$R_2$-pyridine or a 2,4-dimethyl-6-$R_2$-pyridine such as collidine, or the like with an $R_1$-substituted aromatic dialdehyde such as an "$R_1$-substituted" terephthaldehyde under dehydrating conditions and in the absence of a vinyl pyridine and (2) thereafter treating the reaction product with 5-vinyl-2-methylpyridine again under dehydrating conditions, for example:

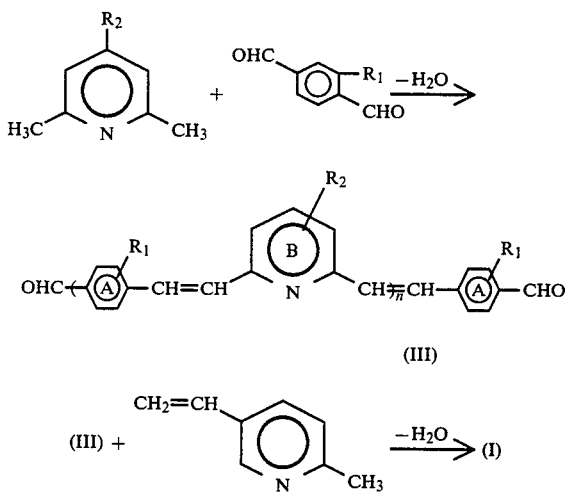

In the first step of this reaction the number of equivalents of aldehyde should be greater than the number of equivalents of methyl groups on the 2 and 4 or 2 and 6 positions on the dimethyl-$R_2$-substituted pyridine, preferably from 1.0 to 1.5 times the number of 2,4 or 2,6 methyls. In the second step the combined equivalents of 2,4 or 2,6 methyls plus vinyl methylpyridine is larger than the total equivalents of aldehydes (i.e., from 1.0 to 2.0 times). As with the stilbazole materials, a catalyst like $ZnCl_2$ can be present if desired. The temperature for reacting the collidine or the like with the dialdehyde may be selected in the range of about 130° to 190° C., preferably 140° to 180° C. and more preferably about 160° C. for times of 1–40, especially 1–20 hours. An inert oxygen-free atmosphere is preferred. The coupling of vinyl methylpyridine to residual aldehyde groups is carried out at somewhat lower temperatures, e.g., 80° to 130° C., preferably 80° to 120° C. and especially about 110° C. again for 1 to 40, and especially 1 to 20 hours, preferably in an inert atmosphere. The dehydrating conditions are achieved by having a water acceptor such as an acid anhydride, e.g. acetic anhydride, in the reaction zone or by permitting the water that is formed to evaporate. This two step process has the advantage of allowing precise control of each of the two reactions and gives a more reproducible product in higher yield.

Blends of VPSP and BMI

The vinyl styrylpyridine (VPSP) and bismaleimide can be blended by hot-melt methods or by solvented "wet" methods, the choice of which depends primarily upon the equipment and preference of the user. In the hot-melt method, the VPSP and BMI are admixed with heating to about 70° C. at which point they melt and form a single phase solution. As with other hot-melt materials, these solutions undergo slow polymerization or cure and with time become increasingly viscous.

In the wet method the VPSP and BMI are dissolved in a solvent. Typically a polar organic solvent such as chloroform, dichloroethane, tetrahydrofuran (THF), dimethylformamide (DMF), dimethylacetamide (DMAC) or a ketone, for example a lower (1–4 carbon) dialkyl ketone—including acetone or methylethylketone is used. Mixed solvents can be used.

In such blends made by either method, the relative amounts of VPSP and BMI will depend in some part upon the properties sought in the cured copolymer and subsequent composites. As the proportion of vinyl styrylpyridine is increased, the cured copolymer becomes less flame-resistant when fully cured but easier to cure. In addition, as the proportion of the vinyl styrylpyridine is increased, a more amorphous, less brittle, less crystalline, tougher cured copolymer is achieved, but one which has decreased flame retardency because of lesser char yield on pyrolysis.

In general, it is desired to have a cured product with good flame retardancy and thus to employ at least about one mole of bismaleimide per mole of vinyl styrylpyridine. To achieve the improved product properties, it is generally desired to use at least about 0.05 moles of vinyl styrylpyridine per mole of bismaleimide. On a weight basis, it is preferred to employ bismaleimide to vinyl styrylpyridine ratios of 10:1 to 1:1, especially 5:1 to 1.5:1, more especially 3:1 to 2:1. The optinum formulation being at a ratio of 7:3.

The blends may additionally contain other materials if desired. In particular, it is of advantage in situations where the VPSP:BMI mixture is used as adhesive to bond the facesheet to the core to have an epoxy modifier present in an amount of up to about 20% by weight. An epoxy modifier is an epoxy resin, especially an aromatic epoxy resin such as Shell Epon ® 828 aromatic epoxy, Ciba Geigy MY-720 aromatic epoxy or the like together with an effective curing amount, such as from 2% to about 30% by weight, basis epoxy, of amine curing agent such as dimaminodiphenylsulfone (DDS). It is believed that this epoxy modifier does not enter into the VPSP:BMI polymer but that it forms a separate polymer when cured. The epoxy modifier enhances the tackiness of the mixture and its usefulness as an adhesive. If an epoxy modifier is used it preferably is present in the range of 5–20% by weight of the total resin. Thus, a preferred composition for use as an adhesive is made up by weight of
BMI:VPSP:Epoxy Modifier
3–2 parts:1 part:1–0.15 part.

Reinforcements and Facesheet Composition

The above-described blends, as hot-melts or as wet mixtures are admixed with reinforcement, and shaped and can be cured to give the desired facesheets.

The reinforcement is generally a fiber and can be organic or inorganic and in organized or disorganized form, for example carbon fiber (graphite fiber), aramide fiber or glass fiber as yarns, tapes, fabrics, or felts; or such materials as chopped fiber. Other materials known in the art as polymer reinforcements, for example boron nitride, and metal fibers, can be employed as well. Carbon fiber in any form is the preferred reinforcement.

Conventional ratios of reinforcement to substrate are employed, such as from about 0.5 to about 5 parts by weight of reinforcement per part of substrate—especially about 1-3 parts by weight of reinforcement per part of substrate.

Other materials such as fillers, pigments, antioxidants and the like can be added as well, if desired. Mixtures of two or more bismaleimides and/or vinyl styrylpyridines also may be used.

The BMI-VPSP blend (wet or hot-melt) is mixed with the reinforcement by dipping, coating or the like. Any solvent is preferably removed prior to cure to avoid voids created by solvent volatilizing from partially cured resin.

In a representative hot-melt method the hot-melt is applied to a graphite tape or fabric reinforcement at 80° C. and passed between a roller and a wiper blade to assist impregnation and remove excess resin. The resin-coated carbon reinforcement is then held at 80° C. for fifteen minutes to precure, cooled and stored at −10° to 5° C. until needed.

In a representative wet method, a graphite cloth is passed through a suitable solution of BMI and VPSP and then passed between a roller and wiper blade. The resin solution-coated carbon is then dried for an hour at 25° C., if desired recoated and redried, and precured such as at 80° C. for fifteen minutes, cooled and stored.

Prepregs made by either of these representative methods are cured by heating. This may be carried out by methods known in the art such as by an autoclave vacuum bag technique or by the platen pressure method. In an example of the autoclave vacuum bag technique, a 33 cm×33 cm prepregged single layer cloth is sandwiched between porous Teflon-coated glass fabric sheets and is placed on a 0.6 cm thick aluminum plate. A glass bleeder cloth is placed against the sandwiched prepreg. The assembly is then vacuum bagged and cured at an external pressure of about 100 psi at a temperature of about 180° C. for one hour. In an example of the platen pressure method, a 33 cm×33 cm prepregged sheet is sandwiched between porous Teflon-coated glass fabric sheets and cured between 0.6 cm thick aluminum plates treated with a mold release agent. The prepreg is cured at contact pressure for ten minutes at 160° C. This is followed by the application of 100 psi pressure at 180° C. for 1–3 hr. The sheet is cooled slowly to 25° C. If an epoxy modifier is present, these conditions will be adequate to effect its cure as well.

In general, one does not have to employ curing agents or catalysts to effect the cure of the VPSP:BMI. It is often desired to not have cure take place during solvent removal so as to minimize or avoid completely having voids due to solvent release in the cured body or to maximize pot life of a melt. If these types of considerations are not at issue, any conventional peroxide or other free radical initiator can be employed as catalyst.

After curing, the facesheets are evaluated for visual defects including flaws, voids, thickness uniformity, and for resin content. The sheets are generally from 0.010 cm to 0.20 cm in thickness (i.e., about 5 mils to about 80 mils in thickness). Preferably the thickness is 0.012 cm to 0.063 cm. Their resin content is preferably from 25% to 50% by weight on a dry basis, and more preferably 30% to 45% by weight. The resin facesheets may thereafter optionally be bonded to a decorative film such as a polyether etherketone film and subsequently bonded with a polymerizable adhesive to a honeycomb substrate to provide a sandwich structure panel assembly of this invention.

The Honeycomb Core

The honeycomb material used herein is composed of a fire-resistant material such as a phenolic dipped aromatic polyamide paper, metal such as aluminum (e.g. American Cyanimide 3/32″ (about 0.23 cm) aluminum), bismaleimide-fiberglass or polyimide dipped aromatic polyamide paper. Such honeycombs can have cell sizes from about 0.1 cm to about 1 cm depending upon the strength/weight properties desired. Such materials are available commercially. Preference is given to the aromatic polyamide papers. These materials are often described by their tradenames such as NOMEX HRH-10 or HRH-310 for a 0.3 cm cell size material. The NOMEX paper polyamides are described in more detail in U.S. Pat. No. 3,811,997, noted above and incorporated herein by reference.

In general, the honeycomb core is between about 0.2 and 4.0 cm in thickness, with preferred thicknesses ranging from about 0.3 to about 3 cm and especially from about 0.4 to about 1 cm.

Decorative Film

The composites of this invention may optionally include an outer decorative film on either or both facesheets. As the name implies, such films are not provided for structural reasons but rather to give an eye-pleasing color and/or texture to the finished panel. This would be advantageous for aircraft interior panels or the like. While any adherent decorative film can be used, preference is given to organic polymeric films such as polyether-etherketone films (PEEK films—an aromatic polyether produced by ICI (Imperial Chemical Industries Limited)). Other representative films which may be used include for example films of polyvinylidene fluoride (Fluorex HT-1, Rexham), polyimide (Kapton-Dupont), polyphenylsulfone (Radel R5010, Union Carbide), polyethersulfone (PES 300P, ICI), and polybenzimidazole (PBI - Celanese). The preferred thickness of these films is 0.005 cm, but films may be used in the range of 0.002 cm to 0.015 cm. The PEEK materials are preferred. These materials are attractive and do not defeat the low flammability-low smoke generation properties achieved by the other composite components. In fact the PEEK materials are seen to significantly decrease smoke generation in some cases.

Adhesives and Composite Fabrication

The composites of this invention are prepared by adhering the optional decorative film to one side of the facesheet and adhering the other side of the facesheet to the open cell edge of the honeycomb core. In certain applications it is desirable to apply facesheets to both open cell edges of the core and this is commonly the case.

Either of two fabrication processes may be used. In the first, the facesheet is preformed and then adhered to the core. This adhering may take place before, after or simultaneous with adhering the decorative overlayer to the facesheet. In this case one uses polymerizable adhesives to bond the facesheet to the core and to bond the overlayer to the facesheet.

This adhering is carried out using adhesives. The adhesives must be strong since the facesheet to core bonds are central to the structural strength and integrity of the composite. They also must not be unduly flammable, a property which makes many conventional adhesives such as the epoxies or the polyolefin contact cements less attractive. Suitable adhesives include for example polyimide adhesives commercially known as American Cyanamide FM-34 or BR-34 adhesives or silicone pressure sensitive adhesives available from Dow Corning. Other equivalent materials maybe used if desired.

In the second process, uncured VPSP:BMI, generally with the optional epoxy modifier being present, is used as the adhesive to bond the facesheet to the core. In this process, the prepregged tape or fabric or the like is applied to the core and cured in place under pressure at the conditions previously described. Thereafter, any decorative overlayers are applied for example with the polyimide or silicone adhesives described above.

In representative fabrication techniques a decorative polyether-etherketone, (PEEK) film is bonded to a preformed or formed in situ faceplate of this invention as follows: PEEK film 0.0065 cm (2.5 mil) is treated with hydrazine monohydrate by soaking the film in hydrazine monohydrate solution for 3-5 hrs at room temperature, then dried and washed with water and dried. Another suitable method of treating the film is plasma etching the film on the one side that is going to be adhered to. A thin film 0.0025-0.013 cm (1-5 mil) of polyimide adhesive is coated on the surface of the treated PEEK film. The coated PEEK film is then bonded to a facesheet at 180°-200° C. for 3-5 hr in a vacuum bag or under 1-100 psig. For best result, the resulting laminate should be cooled slowly to room temperature (5°-10° C./hr). Higher bonding temperatures (say up to 220° C.) or lower (say down to 150° C.) could be used with appropriate adjustment in bonding and cooling time. The surface treatment (i.e., hydrazine soaking or plasma etching) of the decorative film improves adhesion.

In a representative bonding of a preformed facesheet to honeycomb core a facesheet of the invention is coated on one side with 0.0025 to 0.013 cm (1–5 mil) of American Cyanimide BR-34 hot-melt polyimide adhesive and matched to a corresponding sheet of honeycomb. This assembly is placed on a platen press at about 177° C. for two hrs at 25 psi pressure. The resulting composite panel is then slowly cooled and removed from the press.

In a representative in situ bonding, a layer of prepregged carbon fiber tape is applied to the open edge of a sheet of honeycomb. This layer is covered with a second and a third layer of prepregged tape in a 0°, 90°, 0° orientation. This assembly is placed on a platen press at about 177° C. for 2 hours at 25 psi pressure. The tape forms a facesheet and bonds to the honeycomb. The composite is slowly cooled and an overlayer of treated PEEK film is adhered to the outside of the facesheet using 0.0050 cm of polyimide adhesive and 10 psig at 180° C. for 3 hours.

Panels prepared in accordance with the invention exhibit excellent thermal, fire resistance and mechanical properties, making them particularly suited for various high temperature applications where fire safety is a primary consideration. In particular, the panels of the invention may be utilized in aircraft interior panels as well as for walls for aircraft compartments where maximal firecontainment and minimal production of smoke and toxic products are desired.

Additional applications include lightweight composite structural walls for lightweight ships and other transportation vehicles where light weight and fire resistance are needed. The invention may also be embodied in interior wall panels in space station vehicles to provide fire protection and minimize smoke and toxic pyrolysis product generation.

The present invention will be further illustrated by way of the following specific examples which are not intended to limit the scope of applicability of the invention. Parts and percentages are by weight unless expressly stated to be otherwise.

EXAMPLE 1

A. Preparation of VPSP 3.0 Moles of 2,4,6-trimethylpyridine, 4.5 moles of terephthaldehyde, 9.0 moles of acetic acid and 9.0 moles of acetic anhydride are prereacted at 140° C. for 6 hours. The reaction mixture is then cooled to 120° C. and 4.5 moles of 2-methyl-5-vinylpyridine is added. Stirring at 120° C. is continued for 8 hours. The reaction mixture is cooled, and the acetic acid is neutralized with 10% sodium hydroxide. The organic phase is separated, dissolved in tetrahydrofuran (THF) and filtered. The radical inhibitors o-aminophenol and t-butylcatechol are added at the 0.05% and 0.1% levels, respectively. VPSP is isolated by pouring the THF solution into methanol to obtain a solid precipitate. The solid is dried in vacuo to constant weight. The material thus obtained has a melting point exotherm by DSC at 99° C. and a molecular weight of greater than 3000 as determined by vapor pressure osmometry.

B. Preparation of VPSP:BMI Mixture

Mixtures of 30 parts by weight of VPSP produced as in A and 70 parts by weight of the bismaleimide available from Technochemie under the tradename "H795"

are prepared as hot-melts and as wet varnishes as set forth in the detailed description.

C. Facesheet Fabrication

Two facesheet materials are produced using the VPSP:BMI mixtures set out in B. As reinforcement in one material Hercules A-193 Graphite Fabric is employed. In the other, Hercules AS-4 undirectional fiber graphite tape is employed. The reinforcement and resin are combined and cured as set forth above in the detailed description. The weight ratio of resin to reinforcement is 35:65. The finished reinforced facesheet is 0.025 cm thick.

D. Adhering Decorative Surface to Facesheet

A sheet of 0.005 cm PEEK film that is hydrazine treated is bonded to a portion of the graphite fabric reinforced facesheet material of C. using American Cyanimide BR-34 polyimide adhesive in the manner described above.

E. Fabrication of Composites

Composite (1) is made up of the following "sandwich" of components:
PEEK surfaced carbon fabric reinforced facesheet of part D
BR-34 adhesive (0.005 cm)
0.625 cm thick aromatic polyamide paper honeycomb, 0.31 cm cell size, 3.016 lb/ft$^3$ density
BR-34 adhesive (0.005 cm)
Carbon fabric reinforced facesheet of part C
The sandwich is bonded with heat and pressure as above described.

Composite (2) is made up of the following sandwich of components:
3 plies of prepregged carbon filament unidirectional tape in a 0°, 90°, 0° orientation. (The resin is the resin blend prepared in part B above with 10% by weight of EPON 828/DDS epoxy modifier added prior to prepregging.)
Honeycomb as in (1)
3 plies of prepregged tape as above.
The sandwich is bonded together using 180° C. for 3 hours at 25 psig.

F. The composites of E are 0.25 inches thick. They are compared to a 0.25 inch thick "baseline" composite. The baseline composite is representative of composites presently found in aircraft. It has an aromatic polyamide paper honeycomb core. Its facesheets are epoxy resin reinforced with type 181 E-glass fabric over type 120 glass fabric. The outer surfaces of the baseline composite carry a decorative layer made up of a 0.005 inch thick layer of acrylic ink printed polyvinyl fluoride (PVF) overlayed with a 0.002 thich layer of PVF. It is observed that composites 1 and 2 weigh 0.313 and 0.305 lb/ft$^2$ while the baseline material weighs some 20% more (0.365 lb/ft$^2$). This weight saving is an unexpected advantage. U.S. Pat. No. 4,135,014 noted herein in the Background shows composites having carbon-reinforced bismaleimide facesheets which weigh some 35% more than this same baseline composite.

G. Thermogravimetric analyses are run on two samples of composite (1) produced in section E and compared with TGAs of the baseline composite described in section F. The heating rate is 10° C./minute. The first tests are in nitrogen, the second tests are in air. The results are as given in the following Table 1. The results show that the composites of the invention are more stable than the baseline especially at 300°–500° C).

TABLE 1

| Sample Temperature | TGA: % Weight Remaining at Various Temperatures. | | | |
|---|---|---|---|---|
| | Comp. 1 (in nitrogen) | Baseline (in nitrogen) | Comp. 1 (in air) | Baseline (in air) |
| 100° C. | 100 | 98 | 98 | 99 |
| 200° C. | 97 | 98 | 97 | 98 |
| 300° C. | 97 | 97 | 96 | 92 |
| 400° C. | 97 | 90 | 95 | 88 |
| 500° C. | 89 | 78 | 87 | 80 |
| 600° C. | 70 | 64 | 67 | 66 |
| 700° C. | 62 | 51 | 45 | 45 |
| 800° C. | 56 | 41 | 40 | 32 |
| 900° C. | 52 | 34 | 38 | 32 |

H. Char yields are run on composite 1 of part E. At 400° C. it has a char yield of 89%, at 600° C., 62% and at 800° C., 52%. These high values suggest significant fire blocking and fire resistance.

EXAMPLE 2

A. A third composite (3) of the invention is prepared. This material (3) is identical to material (2) with the exception that after fabrication on one facesheet it has a 0.005 cm PEEK film adhered with BR-34 adhesive. The composite (3) is compared with composites essentially identical to composites (1) and (2) and the baseline composite noted in Example 1 in a series of tests.

B. Smoke Evolution Test

Smoke evolution is measured for each material. The NBS Smoke Chamber is utilized as described by the National Fire Protection Association, Bull. 258-T (1974), and Lee T. B., "Interlaboratory Evolution of Smoke Density Chamber", National Bureau of Standards Technical Note 708 (Dec. 1971).

Smoke measurements are expressed in terms of specific optical density, $D_s$, which represents the optical density measured over a unit path length within a chamber of unit volume produced from a specimen of unit surface area.

In the standard procedure for conducting a test with the NBS chamber, the percent light transmission, T, is determined as a function of time until the minimum value is attained. The data is then converted to the specific optical density, $D_s$, where $$D_s = \frac{V}{AL} [\log_{10}(100/T)]$$

The chamber volume, V, is 0.509 m$^3$, the light path length, L is 0.914 m; and the exposed material surface area, A, is 0.004236 m$^2$. The maximum value of $D_s$ reached in the chamber is termed $D_m$. The tests are conducted with a heat source which gave a heat flux of 5 w/cm$^2$ under smoldering conditions. The results obtained are reported in FIG. 2.

It can be seen from FIG. 2 that the baseline sample, representing the prior art, generates a higher specific optical density value, indicating much more smoke produced. This means that one's vision would be obscured much faster in a fire situation with materials of the art than with composites made in accordance with the invention.

It can be further seen that those composites having the optional PEEK decorative films give significantly lower smoke generation values than those without such films.

C. Mass Loss Comparison

The rate of generation of flammable pyrolysis gases from heated samples is determined for each of the four materials tested in section B.

In this study, a nonflaming heat radiation condition is simulated. 7.6 cm×7.6 cm samples were tested for weight loss when exposed to 5.0 w/cm² heat fluxes from an electrical heater. The measurements are conducted in a NBS smoke density chamber modified by the installation of an internal balance (ARBOR model #1206) connected to a HP 5150A thermal printer, providing simultaneous print-outs of weight remaining and time elapsed.

The test is initiated by exposing the sample to the heat flux from the heater and by starting the thermal printer. The test then runs for five minutes and is terminated by pulling an asbestos shield in front of the sample. When a stable reading on the printer is obtained (indicating that no more gases originating from the foam are injected into the chamber from the sample), the printer is shut off. The sample is taken out and allowed to cool down to room temperature.

The burned area on the side of the sample facing the heater is measured. The loss is calculated as follows:

$$\% \, m \, \text{loss} = \frac{\text{weight loss in g}}{\text{area exposed to heat in cm}^2} \times 10^{-2}$$

The area exposed to heat is brought into the equation in an effort to standardize the test runs in terms of how much radiant energy has actually been absorbed by the sample.

The results from the above tests are shown in FIG. 3 and again reveal that the materials of the invention are resistant to generation of gases as compared with the art and further that those materials with the PEEK film are more stable than those without the film.

D. Heat Release Comparison

The heat-release characteristics of composite (2) and the baseline epoxy-fiberglass composite are determined from the Ohio State University (OSU) release-rate apparatus using the technique of heat release in an exposed airstream. The apparatus is operated at an incident heat flux of 5.0 W/cm² to determine the response of materials to this fire environment. The technique and apparatus for this test is described in the reference, "Proposed Test Method for Heat and Visible Smoke Release Rates for Materials", *American Society for Testing and Materials, Annual Book of Standards, Part* 18 (1981). The heat release values given in the following Table 2 were determined by the thermopile method also as described in the above reference.

TABLE 2

| Sample | |
|---|---|
| Composite 2 | Baseline |
| Heat Release Rate at 2 minutes, KW min/m² | Heat Release Rate at 2 minutes, KW min/m² |
| 22 | 66 |

It is evident from the above values that a 200% improvement is obtained with composite (2).

E. Mechanical Properties Evaluation

The flexural strength of composite (2) is compared with the baseline composite. A 67.5% improvement is shown in compressive stress and a 472.2% improvement is shown in flexural modulus. The tests are conducted in accordance with MIL-STD-401B. Details of the tests are given in Table 3.

TABLE 3

| | Sample | |
|---|---|---|
| | Composite 2 | Baseline |
| Compressive Stress: | 107.72 kg/cm | 64.28 kg/cm |
| Failure Load: | 63.65 kg | 38.96 kg |
| Distance Support Post: | 16.51 cm | 16.51 cm |
| Specimen Width: | 7.62 cm | 7.62 cm |
| Compressive Face Thickness: | 0.0305 cm | 0.0381 cm |
| Core Thickness: | 0.6096 cm | 0.6350 cm |
| Flex'l Modulus | 107.71 kg/sq cm | 18.81 kg/sq cm |
| Slope; Load-Deflection Curve: | 30:14 kg/cm | 45.72 cm |
| Span Between Support Posts: | 45.72 cm | 45.72 cm |
| Total Thickness: | 0.6858 cm | 0.7112 cm |

The peel strengths of the facesheets to the honeycomb core is measured on 3 inch wide samples of material (2) and the baseline epoxy-fiberglass using the Climbing Drum method outlined in MIL-STD-401. The new material has a lower peel strength (31.07 cm-kg per 3 in width as compared to 91.47 cm-kg for the baseline material) but still exceeds by almost a factor of three the industry requirement of 11.62 cm-kg.

EXAMPLES 3–15

The preparations of Examples 1 and 2 are repeated 13 times with the following variations:

EXAMPLE 3

In place of a 30:70 VPSP:BMI ratio a 40:60 ratio is employed.

EXAMPLE 4

In place of a 30:70 VPSP:BMI ratio a 20:80 ratio is employed.

EXAMPLE 5

In place of graphite tape and fabric, boron nitride tape and fabric are employed.

EXAMPLE 6

In place of graphite tape and fabric, aramide (Kevlar) fiber tape and fabric are employed.

EXAMPLE 7

In place of a 35:65 resin to reinforcement ratio in the face sheet, a 45:55 ratio is employed.

EXAMPLE 8–10

In place of the 30:70 VPSP:BMI of Example 1, different 30:70 VPSP:BMI's are employed wherein the BMI is Kerimid 353; Kerimid 601 and Technochemie M-751.

EXAMPLES 11–14

In place of the 30:70 VPSP:BMI of Example 1, four different VPSP:BMI's are employed wherein the VPSP is varied to a material of Structure I wherein R, is methyl; wherein $R_1$, is ethyl; wherein $R_2$ is methoxy; and wherein $R_2$ is ethyl.

EXAMPLE 15

In place of the "NOMEX Paper" honeycomb, a bismaleimide-fiberglass honeycomb with ⅛" cells is employed.

If evaluated as in Examples 1 and 2 the materials produced by Examples 3-15 would be expected to give similar superior results to those observed with composites (1), (2), and (3).

The invention may be modified for particular applications to include various honeycomb core configurations. Composite structures having thicknesses in the range from 0.4 cm to 2.5 cm are readily produced. While a preferred core structure is a honeycomb having hexagonal cells, any open-pored core structure, can be employed in practicing the invention. It will also be appreciated that the bonding of the core to the facesheet may be accomplished by a variety of techniques.

It therefore will be appreciated that the present invention can be implemented in a variety of ways by those skilled in the art to suit particular requirements, which are within the scope of the invention. While the invention has been disclosed herein by reference to the details of preferred embodiments, it is to be understood that such disclosure is intended in an illustrative, rather than a limiting sense, as it is contemplated that various modifications in the construction and arrangement of these composites, and in the processes of making them, will readily occur to those skilled in the art, within the spirit of the invention and the scope of the appended claims.

What is claimed is:

1. A lightweight flame resistant composite structure comprising a fire-resistant cellular honeycomb core, having adhered to at least one of its faces a facesheet comprising a reinforced cured vinyl styrylpyridine-bismaleimide copolymer.

2. The composite structure of claim 1 wherein only one facesheet is adhered to only one face of the core.

3. The composite structure of claim 1 wherein facesheets are adhered to both faces of the core.

4. The composite structure of claim 1 wherein the reinforcement in said facesheet is selected from carbon fiber, boron nitride fiber, glass fiber and aramide fiber.

5. The composite structure of claim 1 wherein the material of said cellular honeycomb comprises a member of the group consisting of aluminum, aromatic polyamide paper, polyimide dipped aromatic polyamide paper and bismaleimide-fiberglass.

6. The composite structure of claim 1 wherein said cured vinyl styrylpyridine-bismaleimide copolymer comprises 10 to 1 parts by weight of bismaleimide copolymerized with one part by weight of a vinyl styrylpyridine oligomer of the structure

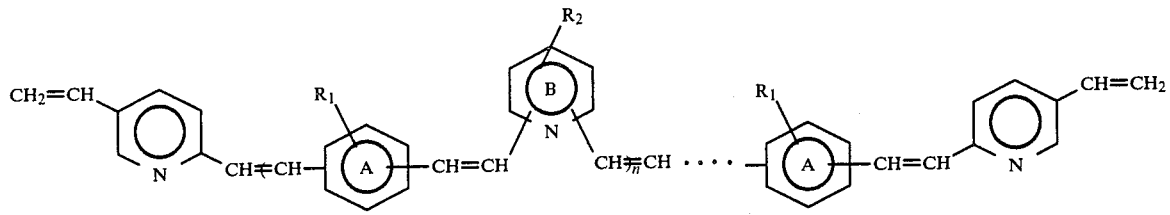

wherein in the A aromatic rings $R_1$ is hydrogen or a lower alkyl and the two olefin bonds are attached to the aromatic ring meta or para to one another, and in the B aromatic ring $R_2$ is a lower alkyl, haloalkyl, or alkoxyl and the two olefin bonds are attached to the B aromatic ring in the 2,6 or 2,4 positions, with $R_2$ in the 4 or 6 position not occupied by an olefin bond.

7. The composite structure of claim 6 wherein $R_1$ is hydrogen and $R_2$ is selected from methyl and methoxy.

8. The composite structure of claim 7 wherein the reinforcement is selected from carbon fiber, aramide fiber, boron nitride fiber and glass fiber.

9. The composite structure of claim 8 wherein the weight ratio of bismaleimide to vinyl styrylpyridine oligomer is from about 5:1 to about 1.5:1.

10. The composite structure of claim 6 wherein said facesheet additionally comprises an adhered decorative overlayer.

11. The composite structure of claim 10 wherein the reinforcement is selected from carbon fiber, aramide fiber, boron nitride fiber and glass fiber.

12. The composite structure of claim 10 wherein said decorative overlayer comprises polyether etherketone.

13. A lightweight flame resistant composite structure comprising an aromatic polyamide honeycomb core having adhered to each of its faces a facesheet comprising a cured reinforced vinyl styrylpyridinebismaleimide copolymer comprises 10 to 1 parts by weight of bismaleimide copolymerized with one part by weight of a vinyl styrylpyridine oligomer of the structure

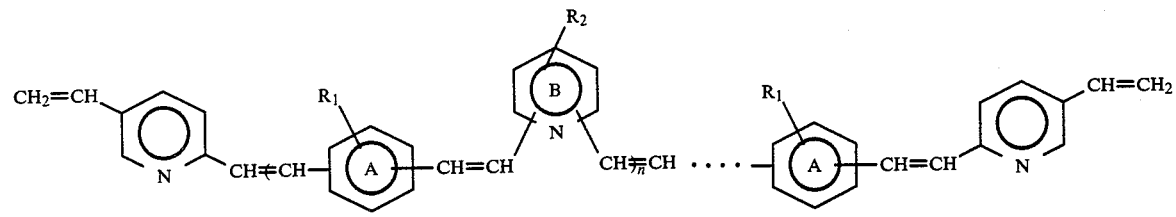

wherein in the A aromatic rings $R_1$ is hydrogen or a lower alkyl and the two olefin bonds are attached to the aromatic ring meta and para to one another, and in the B aromatic ring $R_2$ is a lower alkyl, haloalkyl, or alkoxyl and the two olefin bonds ae attached to the B aromatic ring in the 2,6 or 2,4 positions, with $R_2$ in the 4 or 6 position not occupied by an olefin bond reinforced with carbon fibers and adhered to the outside of at least one of said facesheets a polyether ether ketone decorative oversheet.

14. The structure of claim 13 wherein the facesheets are adhered to the core with a polymerizable polyimide adhesive.

15. The structure of claim 13 wherein the facesheets are adhered to the core with vinyl styrylpyridine-bismaleimide copolymer.

16. The structure of claim 13 wherein the vinyl styrylpyridine-bismaleimide copolymer additionally comprises from about 5% to about 20% by weight of an aromatic epoxy modifier.

* * * * *